(12) United States Patent
Booth

(10) Patent No.: US 6,832,890 B2
(45) Date of Patent: Dec. 21, 2004

(54) GAS TURBINE ENGINE CASING AND ROTOR BLADE ARRANGEMENT

(75) Inventor: Richard S Booth, Derby (GB)

(73) Assignee: Rolls Royce plc, London (GB)

( * ) Notice: Subject to any disclaimer, the term of this patent is extended or adjusted under 35 U.S.C. 154(b) by 0 days.

(21) Appl. No.: 10/609,655

(22) Filed: Jul. 1, 2003

(65) Prior Publication Data

US 2004/0013518 A1 Jan. 22, 2004

(30) Foreign Application Priority Data

Jul. 20, 2002 (GB) .............................. 0216952

(51) Int. Cl.[7] .............................................. F01D 5/20
(52) U.S. Cl. ............................... 415/173.1; 415/174.4; 416/228
(58) Field of Search ............................ 415/173.1, 174.4, 415/914, 58.2–8, 121.2, 169.1, 200, 173.2–5, 119, 57.4, 144; 416/228, 223 A

(56) References Cited

U.S. PATENT DOCUMENTS

| 4,239,452 | A | * | 12/1980 | Roberts, Jr. .............. 415/173.5 |
| 4,274,806 | A | * | 6/1981 | Gallardo, Jr. ............. 415/173.4 |
| 4,630,993 | A | * | 12/1986 | Jensen ........................ 415/58.7 |
| 4,738,586 | A | * | 4/1988 | Harter ...................... 415/173.5 |
| 5,474,417 | A | | 12/1995 | Privett |
| 5,707,206 | A | * | 1/1998 | Goto et al. ............... 415/173.1 |
| 5,762,470 | A | * | 6/1998 | Gelmedov et al. ......... 415/57.4 |
| 6,227,794 | B1 | | 5/2001 | Wojtyczka |
| 6,231,301 | B1 | * | 5/2001 | Barnett et al. ............. 415/57.4 |
| 6,234,747 | B1 | * | 5/2001 | Mielke et al. .............. 415/119 |
| 6,499,940 | B2 | * | 12/2002 | Adams .......................... 415/9 |

* cited by examiner

Primary Examiner—Edward K. Look
Assistant Examiner—James M. McAleenan
(74) Attorney, Agent, or Firm—W. Warren Taltavull; Manelli, Denison & Selter PLLC

(57) ABSTRACT

An arrangement for a gas turbine engine comprises a compressor and its surrounding casing. The casing has a generally cylindrical inner surface, one cylindrical section of the inner casing being provided with a circumferential array of recesses. An axially adjacent cylindrical section of the inner casing surface is provided with an abradable lining. The tips of the rotor blades of the compressor are provided with a treated portion at least partly axially aligned with the recesses in the inner casing, the remaining untreated portion of the rotor blade tips being at least partly axially aligned with the lined section of the inner casing.

11 Claims, 2 Drawing Sheets

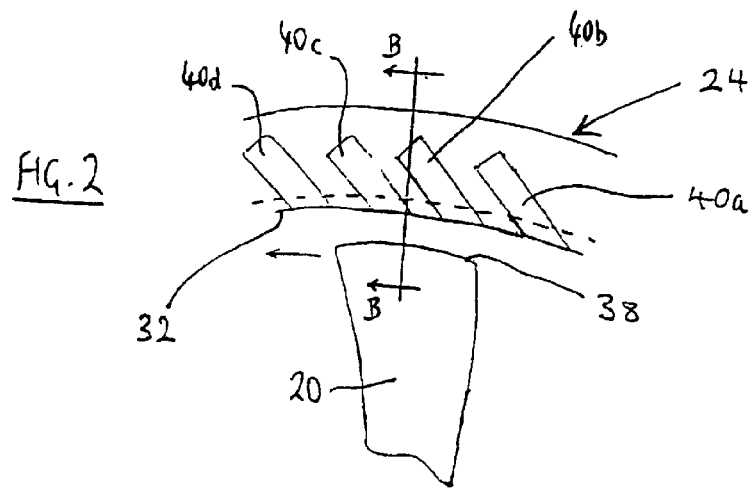
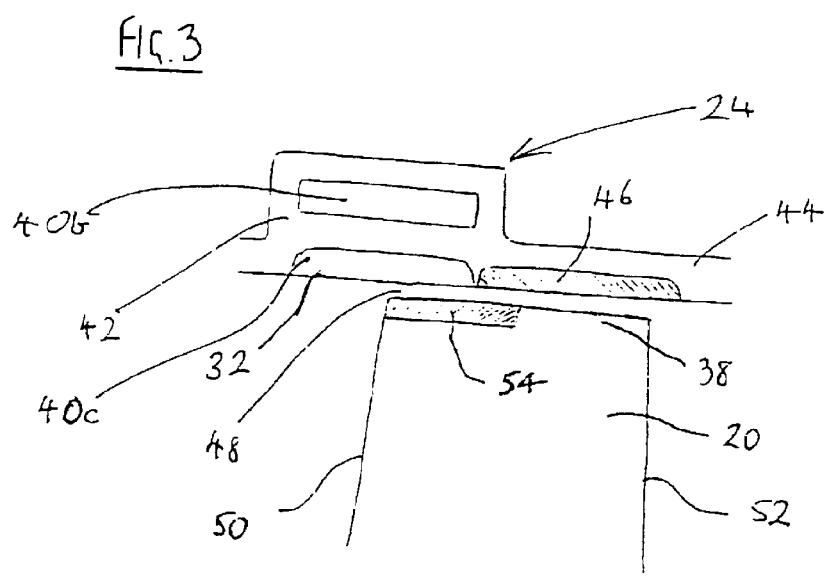
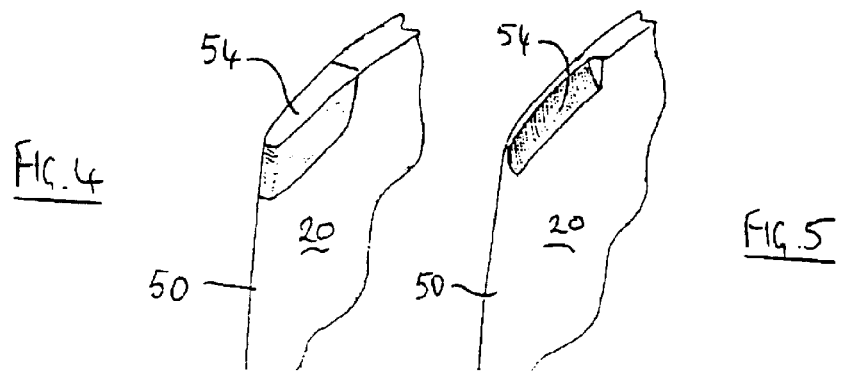

GAS TURBINE ENGINE CASING AND ROTOR BLADE ARRANGEMENT

This invention relates to an arrangement for a gas turbine engine. More particularly, but not exclusively, this invention relates to a gas turbine engine rotor assembly and its surrounding casing.

A gas turbine engine comprises in series, a fan (or low pressure compressor), one or more higher pressure compressors, a combustion chamber for burning the compressed air from the compressors with fuel, and one or more turbines driven by the exhaust gases from the combustor. These components of the gas turbine engine are contained within an annular casing.

The compressors of gas turbine engines are commonly axial flow compressors which comprise alternate rows of rotating (rotor) blades and stationary (stator) vanes, to accelerate and diffuse the air passing therethrough until a required pressure rise is obtained. The casing surrounding the compressors normally comprises a number of axially adjacent cylindrical casing elements bolted together. The amount of clearance between the tips of the compressor rotor blades and the inner surface of the annular casing is an important consideration in gas turbine engine design as a large gap between the tips of the rotor blades and the inner casing surface would allow a larger amount of working fluid leakage over the tips of the blades than is desirable.

It is known to provide the inner surface of the compressor casing with an abradable lining which sacrificially wears away when rubbed by the tips of rotor blades. Compressor rotor blades are often manufactured from titanium, which can ignite when rubbed against an unlined inner surface of the casing. The provision of such an abradable lining assists in keeping the rotor tip clearance to a minimum and also helps to prevent rotor tip damage caused by titanium rotor tip fires.

It is also known to provide slots within the inner surface of the casing radially adjacent the compressor rotor blade tips. These slots provide the advantage of allowing recirculation of the working fluid over the blade tips, within the slots, which is known to provide aerodynamic benefits.

However, the provision of slots within the inner surface of the compressor casing, in combination with an abradable lining, is problematic. Machining such slots within a casing which has already been lined may damage the lining and reduce its benefit to engine efficiency. Applying the abradable lining after machining the slots, for example by blanking the slots prior to spraying the lining material, may result in ragged edges of lining material around the slots. Furthermore, lining material has a tendency to fall away from the casing.

If the inner surface of the compressor casing is not provided with an abradable lining, it is known to thin the tips of the compressor rotor blades. This encourages heat dissipation in the event that the blade tip rubs against the casing, thus reducing the risk of ignition of a titanium fire within the compressor. Blade damage under heavy rubbing may also be reduced. Alternatively, the blade tips may be hardened by the application of a hard coating which helps to reduce the risk of titanium fires by preventing the titanium rubbing directly against the material of the casing. As a further alternative, the blade tips may be cut back, so increasing the tip clearance. This reduces the likelihood of rubbing, but at a cost to efficiency.

According to the present invention there is provided an arrangement for a gas turbine engine, the arrangement comprising a rotor and a surrounding casing, said casing having a generally cylindrical inner surface, said inner surface having a first cylindrical section and a second, axially adjacent cylindrical section, said first section being provided with a plurality of recesses in a circumferential arrangement and said second section being provided with an abradable lining, said rotor comprising an annular array of rotor blades, each blade having an outer tip and each of said tips comprising a treated portion and an untreated portion wherein said treated portion of said tip is at least partly located opposite said first cylindrical section of the inner surface of said casing and said untreated portion of said tip is located opposite said second cylindrical section of the inner surface of said casing.

Preferably the first cylindrical section is disposed axially upstream from said second cylindrical section.

The recesses may comprise slots provided within the cylindrical inner surface of said casing. Each slot may be of generally rectangular cross-section.

The treated portion of the rotor blade tip may be provided at the leading edge region of the rotor blade.

The treated portion of said rotor blade tip may be harder than the untreated portion of said rotor blade tip.

The treated portion of said rotor blade tip may be provided with a hard coating, the coating being harder than the untreated portion of the blade tip. The hard coating may be an aluminium oxide.

The thickness of the treated portion of said rotor blade tip may be less than that of the untreated portion.

The rotor may be a high pressure compressor rotor for a gas turbine engine.

Also according to the present invention there is provided a gas turbine engine including a compressor incorporating an arrangement as described in any of the preceding nine paragraphs.

Embodiments of the invention will now be described by a way of example only, with reference to the accompanying drawings, in which:

FIG. 2 is a cross-sectional view on A—A of FIG. 1 showing a portion of the casing structure and an associated rotor blade;

FIG. 3 is an enlarged cross-sectional view on B—B of FIG. 2;

FIG. 4 is a perspective view of part of the rotor blade tip of FIGS. 2 and 3; and FIG. 5 is a perspective view of a rotor blade tip according to a further embodiment of the present invention.

Figure 1:
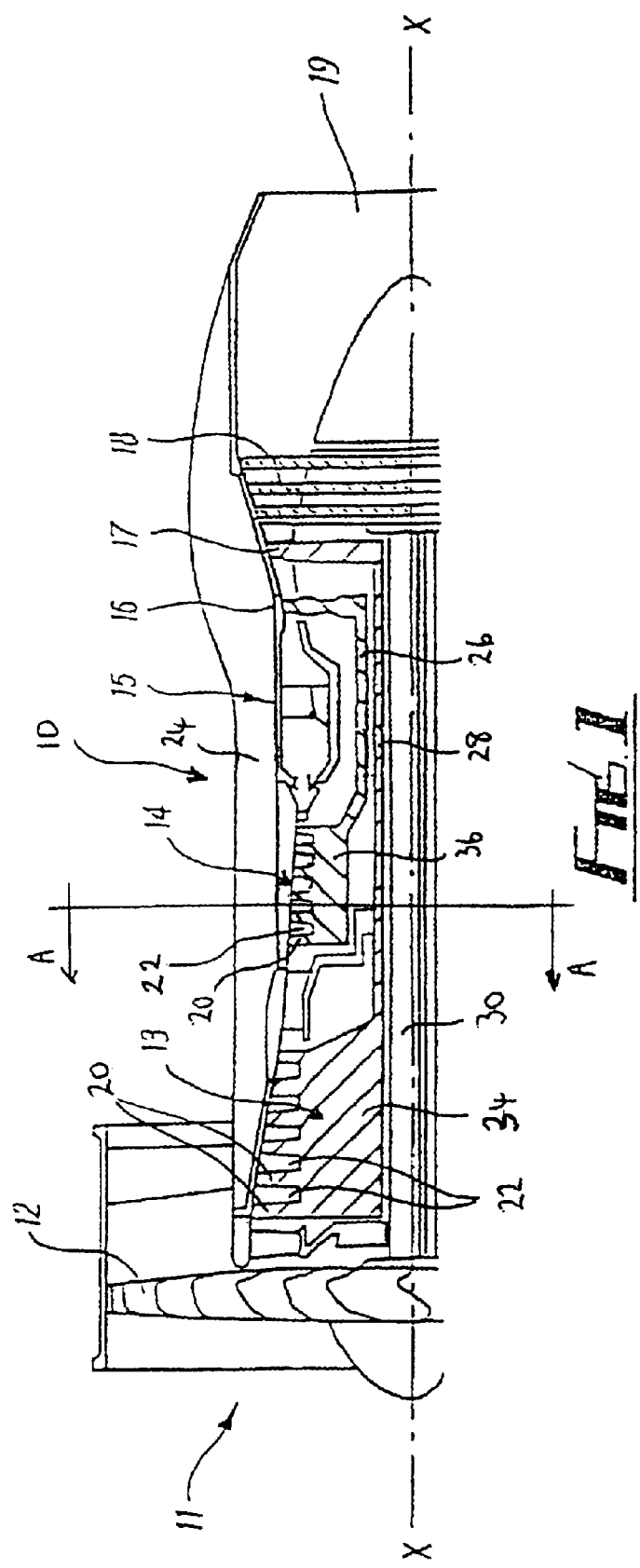
FIG. 1 is a cross-sectional view of half of a gas turbine engine.

Referring to FIG. 1, a gas turbine engine generally indicated at 10 comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produces two air flows, a first air flow into the intermediate pressure compressor 13 and a second air flow which provides propulsive thrust. The intermediate pressure compressor compresses the air flow directed into it, before delivering that air to the high pressure compressor 14 where further compression take place.

The compressed air exhausted from the high pressure compressor 14 is directed into the combustor 15 where it is mixed with fuel and the mixture combusted. The resultant hot combustion products then expand through and thereby drive the high, intermediate and low pressure turbines 16, 17 and 18, before being exhausted through the nozzle 19 to provide additional propulsive thrust. The compressors 13 and 14, the combustor 15 and the turbines 16, 17 and 18 are encased within an annular casing structure 24.

The high, intermediate and low pressure turbines 16, 17 and 18 respectively, drive the high and intermediate pressure compressor 14 and 13 and the fan 12 by respective interconnecting shafts, 26, 28 and 30. The drive shafts 26, 28 and 30 are concentrically mounted around the central axis X—X of the gas turbine engine. The intermediate and high pressure compressors 13 and 14 comprise alternate arrays of rotor blades 20 and stator vanes 22. The radially inner surface 32 of the casing 24 is generally cylindrical and is arranged to encase the rotor. The rotor blades 20 are formed from titanium and are arranged in a circumferential array extending radially outwardly from axis X—X. The rotor blades 20 are positioned beneath the inner surface 32 of the casing 24 and are mounted at their base portions on respective platforms 34 and 36. The blades are of airfoil cross-section, the tips 38 of the blades being positioned close to the inner surface 32 of the casing 24. Each rotor blade comprises a leading edge 50 and a trailing edge 52.

Referring to FIGS. 2 and 3, a plurality of recesses 40 are provided within the inner surface 32 of the casing 24 and form a circumferential array around the rotor blades 20, one of which is shown in FIG. 2 and FIG. 3. In the embodiment four recesses 40a–40d are provided radially outwardly of each rotor blade 20. The recesses are formed as angled slots within the casing 24. The spacing of the slots and the angle at which they extend into the casing depends on the aerodynamic efficiency required by predetermined engine conditions. Hence the choice of slot angle and depth depends on the operating characteristics of individual engines. In this embodiment of the invention the slots 40 are angled at approximately 30° to the inner casing 32. Each slot 40 is of a rectangular box section although other suitable cross-sections may be used such as cylindrical or cuboid. The slots are formed by machining or by electron discharge machining (EDM) techniques during manufacture of the casing 24. In this example, the slots are shown as blind slots, but could alternatively be interconnected, within the body of the casing 24, by a passage known as a plenum.

As shown in FIG. 3 the slotted portion 42 of the casing 24 is disposed upstream of and axially adjacent to an unslotted portion 44 of the casing 24. In order to accommodate the slots 40, the slotted portion of the casing 24 is shown as being radially thicker than the axially adjacent unslotted portion 44 which does not contain slots 40. However, this may not always be necessary. In FIG. 3 the outer portion of one slot 40b is visible above the inner end of the adjacent slot 40c. The view at any position which depend on the details of the slot shape, size, spacing and orientation. The unslotted portion 44 of the casing 24 is provided with an abradable lining 46. The abradable lining 46 is sprayed on to the inner surface 32 of the casing 24 during the manufacturing process, the slotted area of the casing 24 being shielded from abradable material during application. The unslotted portion 44 of the casing 24 is axially adjacent the slotted portion 42 in a downstream direction relative to the direction of airflow through the gas turbine engine 10 from the fan 12 to the exhaust nozzle 19.

The outer tips of the rotor blades 20 are spaced radially inwardly from the inner surface 32 of the casing 24 to provide a small clearance gap 48 between them. The tip 38 of each rotor blade 20 is provided with a leading portion 54 which is hardened with respect to the remainder of the rotor blade 20 as shown in FIG. 4, or thinned as shown in FIG. 5. Hardening may be effected by application of a suitable coating material such as an aluminium oxide, $Al_2O_3$, or by known material hardening techniques. Hardening or thinning of the blade tip reduces the risk of titanium fire, as described above. The thickness of the thinned portion 54 of the rotor tip may be as little as approximately 0.010 mm.

The portion 54 of the blade tip which is provided with the hardening or thinning treatment is located opposite the slotted region of the inner surface of the casing 32 so as to extend partly across the radially adjacent slots. The remainder of the blade tip 38, comprising the untreated area, is located opposite the abradable lining 46 of the casing 44. Thus the inner surface 32 of the casing 24 includes both an abradable lining 46 and a slotted portion 42, the latter being disposed axially upstream from the abradable lining 46. The slotted portion of the casing circumferentially surrounds the treated portions 54 of the rotor blade tips and the lined portion 46 of the casing 32 circumferentially surrounds the untreated blade tip portions.

In use, the treated portion 54 of the rotor blade tip may rub the inner surface of the slotted portion of the casing 24. This will cause wear of the blade or casing, or both. In many practical situations, the blade tip will probably wear in preference to the casing, but some wear of both is likely. Levels of wear will depend on factors such as material choices, shaft speeds etc. As an alternative to hardening or thinning of the portion 54, the blade tip in the portion 54 may be cut back so as to increase the tip clearance in this region and reduce the risk of rubbing. It is envisaged that the cut-back would be at a maximum at the leading edge of the blade 20, reducing to zero near the interface between the treated 54 and untreated 38 portions of the blade tip.

The remainder or untreated portion of the blade tip 38 may rub against the abradable lining 46 again enabling a clearance gap 48 to be formed between the blade tip and the inner surface of the casing, probably by wear of the lining 46, but wear of the untreated portion of the tip 38 may also arise. Thus the aerodynamic advantages of providing slots within the casing structure in combination with the advantages of an abradable lining are provided.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An arrangement for a gas turbine engine, the arrangement comprising a rotor and a surrounding casing, said casing having a generally cylindrical inner surface, said inner surface having a first cylindrical section and a second, axially adjacent cylindrical section, said first section being provided with a plurality of recesses in a circumferential arrangement and said second section being provided with an abradable lining, said rotor comprising an annular array of rotor blades, each blade having an outer tip, and each of said tips comprising a treated portion and an untreated portion wherein said treated portion of said tip is at least partly located opposite said first cylindrical section of the inner surface of said casing and said untreated portion of said tip is at least partly located opposite said second cylindrical section of the inner surface of said casing.

2. An arrangement as claimed in claim 1, wherein said first cylindrical section is disposed axially upstream from said second cylindrical section.

3. An arrangement as claimed in claim 1, wherein said recesses comprise slots provided within the cylindrical inner surface of said casing.

4. An arrangement as claimed in claim 3, wherein each slot is of generally rectangular cross-section.

5. An arrangement as claimed in claim 1 wherein said treated portion of the rotor blade tip is provided at the leading edge region of the rotor blade.

6. An arrangement as claimed in claim 1, wherein the treated portion of said rotor blade tip is harder than the untreated portion of said rotor blade tip.

7. An arrangement as claimed in claim 1, wherein said treated portion of said rotor blade tip is provided with a hard coating.

8. An arrangement as claimed in claim 7, wherein said hard coating is an aluminium oxide coating.

9. An arrangement as claimed in claim 1, wherein the thickness of said treated portion of said rotor blade tip is less than that of said untreated portion.

10. An arrangement as claimed in claim 1 wherein said rotor is a high pressure compressor rotor of a gas turbine engine.

11. A gas turbine engine including a compressor incorporating an arrangement as claimed in claim 1.

* * * * *